(12) United States Patent
Voss

(10) Patent No.: US 12,099,701 B2
(45) Date of Patent: *Sep. 24, 2024

(54) MESSAGE THREAD PRIORITIZATION INTERFACE

(71) Applicant: Snap Inc., Santa Monica, CA (US)

(72) Inventor: Jeremy Voss, Los Angeles, CA (US)

(73) Assignee: Snap Inc., Santa Monica, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/840,105

(22) Filed: Jun. 14, 2022

(65) Prior Publication Data

US 2022/0308721 A1 Sep. 29, 2022

Related U.S. Application Data

(63) Continuation of application No. 16/532,179, filed on Aug. 5, 2019, now Pat. No. 11,455,081.

(51) Int. Cl.
*G06F 3/048* (2013.01)
*G06F 3/0482* (2013.01)
*G06F 3/0484* (2022.01)
*H04L 51/04* (2022.01)
*H04L 51/216* (2022.01)

(52) U.S. Cl.
CPC .......... *G06F 3/0484* (2013.01); *G06F 3/0482* (2013.01); *H04L 51/04* (2013.01); *H04L 51/216* (2022.05)

(58) Field of Classification Search
None
See application file for complete search history.

(56) References Cited

U.S. PATENT DOCUMENTS

| 5,880,731 A | 3/1999 | Liles et al. |
| 6,023,270 A | 2/2000 | Brush, II et al. |

(Continued)

FOREIGN PATENT DOCUMENTS

| CN | 103023759 A | 4/2013 |
| CN | 109863532 A | 6/2019 |

(Continued)

OTHER PUBLICATIONS

"U.S. Appl. No. 16/532,179, Final Office Action mailed Mar. 1, 2022", 17 pgs.

(Continued)

*Primary Examiner* — Thanh T Vu
(74) *Attorney, Agent, or Firm* — Schwegman Lundberg & Woessner, P.A.

(57) ABSTRACT

A message prioritization interface, to perform operations that include: accessing a message repository associated with a user account, where the message repository comprises a plurality of message threads; generating a graphical user interface (GUI) that comprises an allocable region at a first position in the GUI, and a presentation of the plurality of message threads at a second position within the GUI; receiving an input that selects or otherwise identifies a specific message thread from among the plurality of message threads via the GUI; and allocating the selected message thread to the allocable region at the first position in the GUI in response to the input that selects or identifies the specific message thread.

17 Claims, 12 Drawing Sheets

(56) References Cited

U.S. PATENT DOCUMENTS

| | | |
|---|---|---|
| 6,223,165 B1 | 4/2001 | Lauffer |
| 6,772,195 B1 | 8/2004 | Hatlelid et al. |
| 6,842,779 B1 | 1/2005 | Nishizawa |
| 7,342,587 B2 | 3/2008 | Danzig et al. |
| 7,468,729 B1 | 12/2008 | Levinson |
| 7,636,755 B2 | 12/2009 | Blattner et al. |
| 7,639,251 B2 | 12/2009 | Gu et al. |
| 7,775,885 B2 | 8/2010 | Van et al. |
| 7,859,551 B2 | 12/2010 | Bulman et al. |
| 7,865,553 B1 | 1/2011 | Anderson |
| 7,885,931 B2 | 2/2011 | Seo et al. |
| 7,925,703 B2 | 4/2011 | Dinan et al. |
| 8,024,410 B2 | 9/2011 | Madnani |
| 8,088,044 B2 | 1/2012 | Tchao et al. |
| 8,095,878 B2 | 1/2012 | Bates et al. |
| 8,108,774 B2 | 1/2012 | Finn et al. |
| 8,117,281 B2 | 2/2012 | Robinson et al. |
| 8,130,219 B2 | 3/2012 | Fleury et al. |
| 8,146,005 B2 | 3/2012 | Jones et al. |
| 8,151,191 B2 | 4/2012 | Nicol |
| 8,266,218 B2 | 9/2012 | Keohane et al. |
| 8,375,400 B2 | 2/2013 | Sutedja et al. |
| 8,384,719 B2 | 2/2013 | Reville et al. |
| RE44,054 E | 3/2013 | Kim |
| 8,396,708 B2 | 3/2013 | Park et al. |
| 8,425,322 B2 | 4/2013 | Gillo et al. |
| 8,458,601 B2 | 6/2013 | Castelli et al. |
| 8,462,198 B2 | 6/2013 | Lin et al. |
| 8,484,158 B2 | 7/2013 | Deluca et al. |
| 8,495,503 B2 | 7/2013 | Brown et al. |
| 8,495,505 B2 | 7/2013 | Smith et al. |
| 8,504,926 B2 | 8/2013 | Wolf |
| 8,559,980 B2 | 10/2013 | Pujol |
| 8,564,621 B2 | 10/2013 | Branson et al. |
| 8,564,710 B2 | 10/2013 | Nonaka et al. |
| 8,581,911 B2 | 11/2013 | Becker et al. |
| 8,597,121 B2 | 12/2013 | del Valle |
| 8,601,051 B2 | 12/2013 | Wang |
| 8,601,379 B2 | 12/2013 | Marks et al. |
| 8,632,408 B2 | 1/2014 | Gillo et al. |
| 8,648,865 B2 | 2/2014 | Dawson et al. |
| 8,659,548 B2 | 2/2014 | Hildreth |
| 8,683,354 B2 | 3/2014 | Khandelwal et al. |
| 8,692,830 B2 | 4/2014 | Nelson et al. |
| 8,739,048 B2 | 5/2014 | Moudy et al. |
| 8,743,151 B1 | 6/2014 | Fulcher et al. |
| 8,751,559 B2 | 6/2014 | Richardson et al. |
| 8,810,513 B2 | 8/2014 | Ptucha et al. |
| 8,812,171 B2 | 8/2014 | Filev et al. |
| 8,832,201 B2 | 9/2014 | Wall |
| 8,832,552 B2 | 9/2014 | Arrasvuori et al. |
| 8,839,327 B2 | 9/2014 | Amento et al. |
| 8,890,926 B2 | 11/2014 | Tandon et al. |
| 8,892,999 B2 | 11/2014 | Nims et al. |
| 8,924,250 B2 | 12/2014 | Bates et al. |
| 8,963,926 B2 | 2/2015 | Brown et al. |
| 8,989,786 B2 | 3/2015 | Feghali |
| 9,086,776 B2 | 7/2015 | Ye et al. |
| 9,105,014 B2 | 8/2015 | Collet et al. |
| 9,241,184 B2 | 1/2016 | Weerasinghe |
| 9,256,860 B2 | 2/2016 | Herger et al. |
| 9,262,744 B2 | 2/2016 | Lee et al. |
| 9,298,257 B2 | 3/2016 | Hwang et al. |
| 9,314,692 B2 | 4/2016 | Konoplev et al. |
| 9,330,483 B2 | 5/2016 | Du et al. |
| 9,357,174 B2 | 5/2016 | Li et al. |
| 9,361,510 B2 | 6/2016 | Yao et al. |
| 9,378,576 B2 | 6/2016 | Bouaziz et al. |
| 9,402,057 B2 | 7/2016 | Kaytaz et al. |
| 9,412,192 B2 | 8/2016 | Mandel et al. |
| 9,460,541 B2 | 10/2016 | Li et al. |
| 9,461,833 B1 | 10/2016 | Marra et al. |
| 9,461,947 B1 | 10/2016 | Lan et al. |
| 9,471,145 B2 | 10/2016 | Langlois et al. |
| 9,489,760 B2 | 11/2016 | Li et al. |
| 9,503,845 B2 | 11/2016 | Vincent |
| 9,508,197 B2 | 11/2016 | Quinn et al. |
| 9,544,257 B2 | 1/2017 | Ogundokun et al. |
| 9,576,400 B2 | 2/2017 | Van Os et al. |
| 9,589,357 B2 | 3/2017 | Li et al. |
| 9,592,449 B2 | 3/2017 | Barbalet et al. |
| 9,648,376 B2 | 5/2017 | Chang et al. |
| 9,690,441 B2 | 6/2017 | Kim et al. |
| 9,697,635 B2 | 7/2017 | Quinn et al. |
| 9,706,040 B2 | 7/2017 | Kadirvel et al. |
| 9,744,466 B2 | 8/2017 | Fujioka |
| 9,746,990 B2 | 8/2017 | Anderson et al. |
| 9,749,270 B2 | 8/2017 | Collet et al. |
| 9,749,273 B2 | 8/2017 | Zlatokrilov |
| 9,792,714 B2 | 10/2017 | Li et al. |
| 9,832,152 B2 | 11/2017 | Forstall et al. |
| 9,839,844 B2 | 12/2017 | Dunstan et al. |
| 9,883,838 B2 | 2/2018 | Kaleal, III et al. |
| 9,898,849 B2 | 2/2018 | Du et al. |
| 9,911,073 B1 | 3/2018 | Spiegel et al. |
| 9,936,165 B2 | 4/2018 | Li et al. |
| 9,959,037 B2 | 5/2018 | Chaudhri et al. |
| 9,980,100 B1 | 5/2018 | Charlton et al. |
| 9,990,373 B2 | 6/2018 | Fortkort |
| 9,990,610 B2 | 6/2018 | Agarwal et al. |
| 9,998,415 B1 | 6/2018 | Meschkat et al. |
| 10,039,988 B2 | 8/2018 | Lobb et al. |
| 10,097,492 B2 | 10/2018 | Tsuda et al. |
| 10,116,598 B2 | 10/2018 | Tucker et al. |
| 10,155,168 B2 | 12/2018 | Blackstock et al. |
| 10,225,700 B2 | 3/2019 | Cheung et al. |
| 10,242,477 B1 | 3/2019 | Charlton et al. |
| 10,242,503 B2 | 3/2019 | McPhee et al. |
| 10,262,250 B1 | 4/2019 | Spiegel et al. |
| 10,362,219 B2 | 7/2019 | Wilson et al. |
| 10,475,225 B2 | 11/2019 | Park et al. |
| 10,504,266 B2 | 12/2019 | Blattner et al. |
| 10,573,048 B2 | 2/2020 | Ni et al. |
| 10,657,701 B2 | 5/2020 | Osman et al. |
| 10,685,074 B2 | 6/2020 | Deets, Jr. et al. |
| 11,455,081 B2 | 9/2022 | Voss |
| 2002/0067362 A1 | 6/2002 | Agostino Nocera et al. |
| 2002/0169644 A1 | 11/2002 | Greene |
| 2005/0162419 A1 | 7/2005 | Kim et al. |
| 2005/0206610 A1 | 9/2005 | Cordelli |
| 2006/0294465 A1 | 12/2006 | Ronen et al. |
| 2007/0113181 A1 | 5/2007 | Blattner et al. |
| 2007/0143428 A1 | 6/2007 | Kumar et al. |
| 2007/0168863 A1 | 7/2007 | Blattner et al. |
| 2007/0176921 A1 | 8/2007 | Iwasaki et al. |
| 2008/0148154 A1 | 6/2008 | Burrell et al. |
| 2008/0158222 A1 | 7/2008 | Li et al. |
| 2008/0301250 A1 | 12/2008 | Hardy et al. |
| 2009/0016617 A1 | 1/2009 | Bregman-amitai et al. |
| 2009/0055484 A1 | 2/2009 | Vuong et al. |
| 2009/0070688 A1 | 3/2009 | Gyorfi et al. |
| 2009/0083389 A1 | 3/2009 | Kirkland et al. |
| 2009/0099925 A1 | 4/2009 | Mehta et al. |
| 2009/0100378 A1 | 4/2009 | Klassen et al. |
| 2009/0106672 A1 | 4/2009 | Burstrom |
| 2009/0106676 A1 | 4/2009 | Brezina et al. |
| 2009/0119678 A1 | 5/2009 | Shih et al. |
| 2009/0158170 A1 | 6/2009 | Narayanan et al. |
| 2009/0177976 A1 | 7/2009 | Bokor et al. |
| 2009/0199207 A1 | 8/2009 | Thomas et al. |
| 2009/0202114 A1 | 8/2009 | Morin et al. |
| 2009/0265604 A1 | 10/2009 | Howard et al. |
| 2009/0300525 A1 | 12/2009 | Jolliff et al. |
| 2009/0303984 A1 | 12/2009 | Clark et al. |
| 2009/0319911 A1 | 12/2009 | Mccann et al. |
| 2010/0011422 A1 | 1/2010 | Mason et al. |
| 2010/0023885 A1 | 1/2010 | Reville et al. |
| 2010/0058203 A1 | 3/2010 | Moudy et al. |
| 2010/0115426 A1 | 5/2010 | Liu et al. |
| 2010/0162149 A1 | 6/2010 | Sheleheda et al. |
| 2010/0203968 A1 | 8/2010 | Gill et al. |
| 2010/0227682 A1 | 9/2010 | Reville et al. |
| 2010/0262917 A1 | 10/2010 | Hardy et al. |
| 2011/0093780 A1 | 4/2011 | Dunn |

(56) References Cited

U.S. PATENT DOCUMENTS

| | | |
|---|---|---|
| 2011/0115798 A1 | 5/2011 | Nayar et al. |
| 2011/0148864 A1 | 6/2011 | Lee et al. |
| 2011/0239136 A1 | 9/2011 | Goldman et al. |
| 2012/0113106 A1 | 5/2012 | Choi et al. |
| 2012/0124458 A1 | 5/2012 | Cruzada |
| 2012/0130717 A1 | 5/2012 | Xu et al. |
| 2012/0149342 A1 | 6/2012 | Cohen et al. |
| 2013/0024780 A1 | 1/2013 | Sutedja et al. |
| 2013/0103760 A1 | 4/2013 | Golding et al. |
| 2013/0125020 A1 | 5/2013 | Lee et al. |
| 2013/0125059 A1 | 5/2013 | Lee et al. |
| 2013/0159878 A1 | 6/2013 | Kim et al. |
| 2013/0179800 A1* | 7/2013 | Jeong ............... H04L 51/216 715/752 |
| 2013/0201187 A1 | 8/2013 | Tong et al. |
| 2013/0249948 A1 | 9/2013 | Reitan |
| 2013/0257877 A1 | 10/2013 | Davis |
| 2014/0043329 A1 | 2/2014 | Wang et al. |
| 2014/0055554 A1 | 2/2014 | Du et al. |
| 2014/0125678 A1 | 5/2014 | Wang et al. |
| 2014/0129343 A1 | 5/2014 | Finster et al. |
| 2014/0214995 A1 | 7/2014 | Zlatokrilov |
| 2015/0033145 A1 | 1/2015 | Forstall et al. |
| 2015/0142897 A1* | 5/2015 | Alten ............... H04L 51/56 709/206 |
| 2015/0200878 A1 | 7/2015 | Shih et al. |
| 2015/0206349 A1 | 7/2015 | Rosenthal et al. |
| 2015/0334075 A1 | 11/2015 | Wang et al. |
| 2016/0062605 A1 | 3/2016 | Agarwal et al. |
| 2016/0134840 A1 | 5/2016 | Mcculloch |
| 2016/0154556 A1* | 6/2016 | Cheung ............... H04L 51/216 715/752 |
| 2016/0196031 A1 | 7/2016 | Bovet et al. |
| 2016/0234149 A1 | 8/2016 | Tsuda et al. |
| 2016/0283052 A1 | 9/2016 | Seo |
| 2016/0364368 A1 | 12/2016 | Chen et al. |
| 2017/0080346 A1 | 3/2017 | Abbas |
| 2017/0087473 A1 | 3/2017 | Siegel et al. |
| 2017/0113140 A1 | 4/2017 | Blackstock et al. |
| 2017/0118145 A1 | 4/2017 | Aittoniemi et al. |
| 2017/0199855 A1 | 7/2017 | Fishbeck |
| 2017/0235848 A1 | 8/2017 | Van Dusen et al. |
| 2017/0269800 A1* | 9/2017 | Park ............... H04M 1/72436 |
| 2017/0289086 A1 | 10/2017 | Grotto et al. |
| 2017/0310934 A1 | 10/2017 | Du et al. |
| 2017/0312634 A1 | 11/2017 | Ledoux et al. |
| 2017/0336926 A1 | 11/2017 | Chaudhri et al. |
| 2018/0026929 A1 | 1/2018 | Nambiar et al. |
| 2018/0047200 A1 | 2/2018 | O'hara et al. |
| 2018/0113587 A1 | 4/2018 | Allen et al. |
| 2018/0114223 A1 | 4/2018 | Dellostritto |
| 2018/0115503 A1 | 4/2018 | Baldwin et al. |
| 2018/0234382 A1 | 8/2018 | Cunico et al. |
| 2018/0315076 A1 | 11/2018 | Andreou |
| 2018/0315133 A1 | 11/2018 | Brody et al. |
| 2018/0315134 A1 | 11/2018 | Amitay et al. |
| 2019/0001223 A1 | 1/2019 | Blackstock et al. |
| 2019/0014065 A1 | 1/2019 | Lim et al. |
| 2019/0057616 A1 | 2/2019 | Cohen et al. |
| 2019/0188920 A1 | 6/2019 | Mcphee et al. |
| 2019/0212829 A1 | 7/2019 | Yang et al. |
| 2019/0220823 A1 | 7/2019 | Sutedja et al. |
| 2020/0057596 A1 | 2/2020 | Kim et al. |
| 2020/0341593 A1 | 10/2020 | Han et al. |
| 2021/0041997 A1 | 2/2021 | Voss |

FOREIGN PATENT DOCUMENTS

| | | |
|---|---|---|
| CN | 110168478 A | 8/2019 |
| CN | 114207567 A | 3/2022 |
| EP | 2184092 A2 | 5/2010 |
| JP | 2001230801 A | 8/2001 |
| JP | 5497931 B2 | 3/2014 |
| KR | 101445263 B1 | 9/2014 |
| WO | WO-2003094072 A1 | 11/2003 |
| WO | WO-2004095308 A1 | 11/2004 |
| WO | WO-2006107182 A1 | 10/2006 |
| WO | WO-2007134402 A1 | 11/2007 |
| WO | WO-2008011629 A2 | 1/2008 |
| WO | WO-2012139276 A1 | 10/2012 |
| WO | WO-2013027893 A1 | 2/2013 |
| WO | WO-2013152454 A1 | 10/2013 |
| WO | WO-2013166588 A1 | 11/2013 |
| WO | WO-2014031899 A1 | 2/2014 |
| WO | WO-2014194439 A1 | 12/2014 |
| WO | WO-2016090605 A1 | 6/2016 |
| WO | WO-2018081013 A1 | 5/2018 |
| WO | WO-2018102562 A1 | 6/2018 |
| WO | WO-2018129531 A1 | 7/2018 |
| WO | WO-2019089613 A1 | 5/2019 |
| WO | WO-2021026563 A1 | 2/2021 |

OTHER PUBLICATIONS

"U.S. Appl. No. 16/532,179, Final Office Action mailed Apr. 13, 2021", 11 pgs.

"U.S. Appl. No. 16/532,179, Final Office Action mailed Jul. 23, 2020", 10 pgs.

"U.S. Appl. No. 16/532,179, Final Office Action mailed Aug. 4, 2021", 16 pgs.

"U.S. Appl. No. 16/532,179, Final Office Action mailed Sep. 18, 2020", 11 pgs.

"U.S. Appl. No. 16/532,179, Non Final Office Action mailed Jan. 28, 2021", 10 pgs.

"U.S. Appl. No. 16/532,179, Non Final Office Action mailed Jun. 25, 2021", 14 pgs.

"U.S. Appl. No. 16/532,179, Non Final Office Action mailed Jun. 29, 2020", 9 pgs.

"U.S. Appl. No. 16/532,179, Non Final Office Action mailed Aug. 10, 2020", 12 pgs.

"U.S. Appl. No. 16/532,179, Non Final Office Action mailed Nov. 16, 2021", 15 pgs.

"U.S. Appl. No. 16/532, 179, Notice of Allowance mailed May 13, 2022", 23 pgs.

"U.S. Appl. No. 16/532,179, Response filed Feb. 16, 2022 to Non Final Office Action mailed Nov. 16, 2021", 11 pgs.

"U.S. Appl. No. 16/532,179, Response filed Mar. 24, 2021 to Non Final Office Action mailed Jan. 28, 2021", 12 pgs.

"U.S. Appl. No. 16/532,179, Response filed Apr. 29, 2022 to Final Office Action mailed Mar. 1, 2022", 12 pgs.

"U.S. Appl. No. 16/532,179, Response filed Jun. 14, 2021 to Final Office Action mailed Apr. 13, 2021", 9 pgs.

"U.S. Appl. No. 16/532,179, Response filed Jul. 6, 2021 to Non Final Office Action mailed Jun. 25, 2021", 11 pgs.

"U.S. Appl. No. 16/532,179, Response filed Jul. 13, 2020 to Non Final Office Action mailed Jun. 29, 2020", 11 pgs.

"U.S. Appl. No. 16/532,179, Response filed Jul. 27, 2020 to Final Office Action mailed Jul. 23, 2020", 11 pgs.

"U.S. Appl. No. 16/532,179, Response filed Aug. 13, 2020 to Non Final Office Action mailed Aug. 10, 2020", 11 pgs.

"U.S. Appl. No. 16/532,179, Response filed Oct. 4, 2021 to Final Office Action mailed Aug. 4, 2021", 12 pgs.

"U.S. Appl. No. 16/532,179, Response filed Nov. 23, 2020 to Final Office Action mailed Sep. 18, 2020", 12 pgs.

"International Application Serial No. PCT/US2020/070369, International Preliminary Report on Patentability mailed Feb. 17, 2022", 7 pgs.

"International Application Serial No. PCT/US2020/070369, International Search Report mailed Nov. 6, 2020", 3 pgs.

"International Application Serial No. PCT/US2020/070369, Written Opinion mailed Nov. 6, 2020", 5 pgs.

U.S. Appl. No. 16/532,179, filed Aug. 5, 2019, Message Thread Prioritization Interface.

"Chinese Application Serial No. 202080055411.4, Response filed Feb. 18, 2024 to Office Action mailed Sep. 28, 2023", w/ English Claims, 14 pgs.

(56) References Cited

OTHER PUBLICATIONS

"Chinese Application Serial No. 202080055411.4, Office Action mailed Sep. 28, 2023", w/ English Translation, 15 pgs.
"Korean Application Serial No. 10-2022-7006857, Notice of Preliminary Rejection mailed Jan. 10, 2024", w/ English Translation, 8 pgs.

* cited by examiner

400

ACCESSING A MESSAGE REPOSITORY ASSOCIATED WITH A USER ACCOUNT, THE MESSAGE REPOSITORY COMPRISING A PLURALITY OF MESSAGE THREADS THAT INCLUDE AT LEAST A FIRST MESSAGE THREAD
402

GENERATING A GRAPHICAL USER INTERFACE (GUI) THAT COMPRISES AN ALLOCABLE REGION AT A FIRST POSITION IN THE GUI, AND A PRESENTATION OF THE PLURALITY OF MESSAGE THREADS AT A SECOND POSITION IN THE GUI
404

RECEIVING AN INPUT THAT SELECTS THE DISPLAY OF THE FIRST MESSAGE THREAD VIA THE GUI
406

ALLOCATING THE FIRST MESSAGE THREAD TO THE ALLOCABLE REGION AT THE FIRST POSITION IN THE GUI IN RESPONSE TO THE INPUT THAT SELECTS THE DISPLAY OF THE FIRST MESSAGE THREAD
408

```
┌─────────────────────────────────────────────────────────────┐
│ RECEIVING A MESSAGE FROM A SENDER ASSOCIATED WITH THE FIRST │
│                       MESSAGE THREAD                         │
│                            502                               │
└─────────────────────────────────────────────────────────────┘
                              │
                              ▼
┌─────────────────────────────────────────────────────────────┐
│ PRESENTING A NOTIFICATION BASED ON THE MESSAGE WITHIN THE   │
│    ALLOCABLE REGION AT THE FIRST POSITION IN THE GUI        │
│                            504                               │
└─────────────────────────────────────────────────────────────┘
```

RECEIVING AN IDENTIFICATION OF A SENDER ASSOCIATED WITH THE
FIRST MESSAGE THREAD
602

ALLOCATING THE FIRST MESSAGE THREAD TO THE ALLOCABLE REGION
AT THE FIRST POSITION IN THE GUI IN RESPONSE TO THE IDENTIFICATION
OF THE SENDER
604

*FIG. 6*

700 

```
┌─────────────────────────────────────────────────────────────┐
│ RECEIVING AN IDENTIFICATION OF A SECOND SENDER ASSOCIATED WITH │
│                  A SECOND MESSAGE THREAD                     │
│                            702                               │
└─────────────────────────────────────────────────────────────┘
                              │
                              ▼
┌─────────────────────────────────────────────────────────────┐
│   DE-ALLOCATING THE FIRST MESSAGE THREAD FROM THE ALLOCABLE  │
│                      REGION OF THE GUI                       │
│                            704                               │
└─────────────────────────────────────────────────────────────┘
                              │
                              ▼
┌─────────────────────────────────────────────────────────────┐
│   ALLOCATING THE SECOND MESSAGE THREAD TO THE ALLOCABLE     │
│                      REGION OF THE GUI                       │
│                            706                               │
└─────────────────────────────────────────────────────────────┘
```

*FIG. 7*

MESSAGE THREAD PRIORITIZATION INTERFACE

CROSS-REFERENCE TO RELATED APPLICATION

This application is a continuation of U.S. patent application Ser. No. 16/532,179, filed Aug. 5, 2019, which is incorporated by reference herein in its entirety.

TECHNICAL FIELD

Embodiments of the present disclosure relate generally to graphical user interfaces, and more specifically to interface elements presented within graphical user interfaces.

BACKGROUND

A graphical user interface (GUI) is a form of user interface that allows users to interact with electronic devices through graphical icons and visual indicators instead of purely text-based user interfaces, typed command labels, or text navigation.

Instant messaging (IM) technology is a type of online chat that offers real-time text transmission over the Internet. Short messages are typically transmitted between parties through respective client devices and presented within GUIs. Some IM applications can use push technology to provide real-time text, which transmits messages character by character, as they are composed. Instant messaging conversations are often referred to as "message threads," wherein the message threads may each comprise a series of messages displayed in a chronological order.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

FIG. 4 is a flowchart illustrating a method for allocating a display of a message thread to an allocable region at a predefined position in a GUI, according to certain example embodiments.

FIG. 5 is a flowchart illustrating a method for presenting a notification, according to certain example embodiments.

FIG. 6 is a flowchart illustrating a method for allocating a display of a message thread to an allocable region at a predefined position in a GUI, according to certain example embodiments.

FIG. 7 is a flowchart illustrating a method for allocating a display of a message thread to an allocable region at a predefined position in a GUI, according to certain example embodiments.

DETAILED DESCRIPTION

Figure 1:
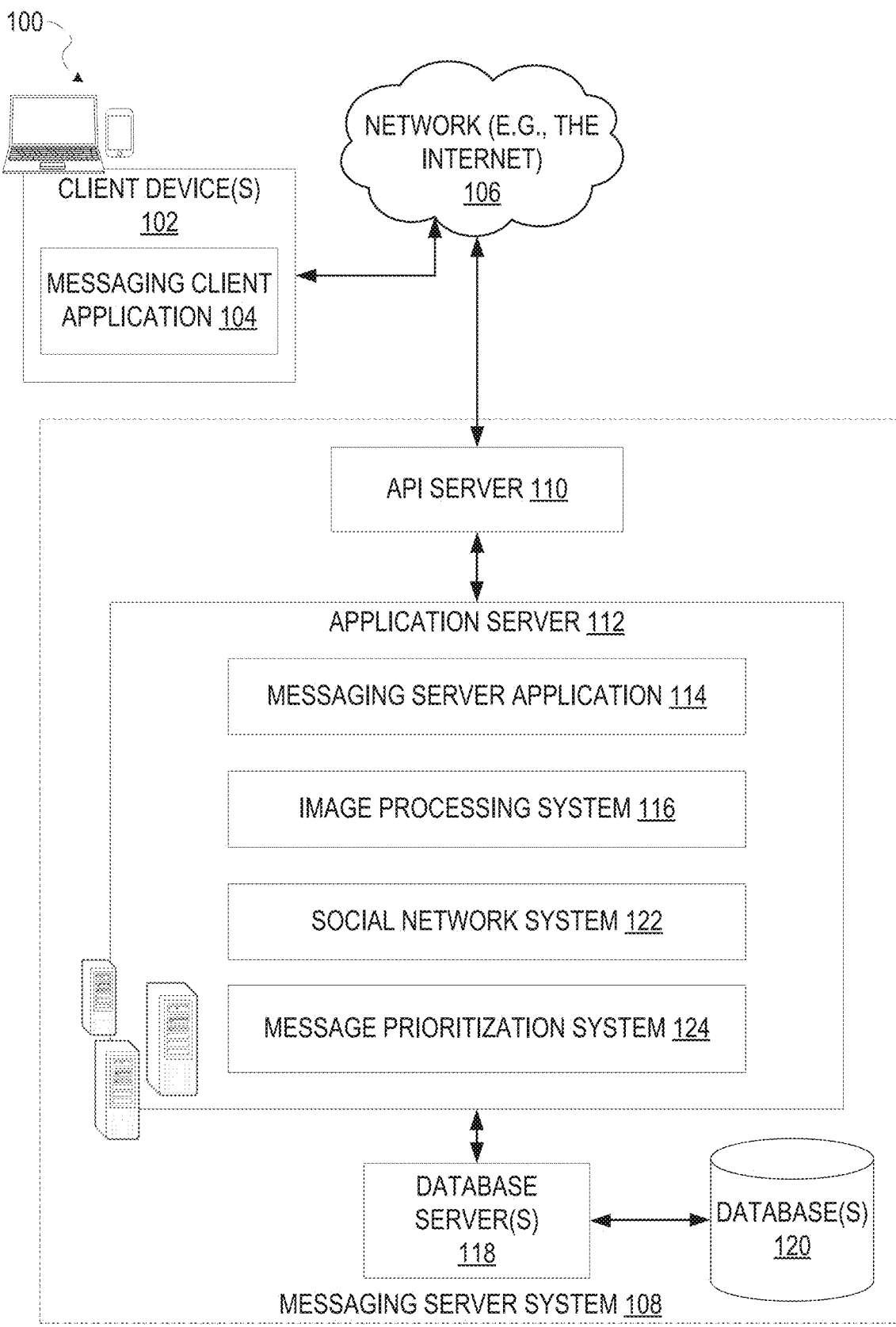
FIG. 1 is a block diagram showing an example messaging system for exchanging data (e.g., messages and associated content) over a network in accordance with some embodiments, wherein the messaging system includes a message prioritization system.

As discussed above, GUIs are a form of user interface that allows users to interact with electronic devices through graphical icons and visual indicators instead of purely text-based user interfaces, typed command labels, or text navigation. Messaging applications typically present messages threads to users within GUI configured to present the message threads in an organized manner, allowing users to easily return to a conversation where they last left off. These message threads are often presented to users in chronological order, as the user receives them.

As reliance on messaging applications increases, the velocity in which users may send and receive messages also increases, resulting in large numbers of messages being presented within a message feed of a GUI at a client device. As a result, users may lose track of their favorite conversations (i.e., message threads) due to the message threads being pushed down in a message feed by more recent incoming messages. Accordingly, an interface to enable users to allocate one or more of their favorite conversations (i.e., message threads) to a predefined location within a message feed would be beneficial by providing users with a quick and convenient means of accessing those conversations. While the remainder of the message feed may populate and update based on a chronological sort order (based on timestamps associated with the messages), the messages allocated to the predefined locations may remain "pinned" to those locations for quick access.

Example embodiments described herein relate to systems and methods for a message prioritization interface, to perform operations that include: accessing a message repository associated with a user account, where the message repository comprises a plurality of message threads; generating a GUI that comprises an allocable region at a first position in the GUI, and a presentation of the plurality of message threads at a second position within the GUI; receiving an input that selects or otherwise identifies a specific message thread from among the plurality of message threads via the GUI; and allocating the selected message thread to the allocable region at the first position in the GUI in response to the input that selects or identifies the specific message thread.

According to certain example embodiments, the message threads may each comprise a series of messages received from one or more sender. For example, the message threads may include one to one message threads, as well as one to many message threads. Subsequent messages received in message threads allocated to the predefined region may be presented as notifications to a user within the predefined region of the GUI.

In some embodiments, a display of a message thread may comprise one or more user identifiers of users engaged in the message thread, as well as a temporal indicator based on a timestamp of a most recent message received in the message thread. Responsive to allocating a message thread to the allocable region, the message prioritization interface may assign one or more graphical icons to the display of the message thread to provide an indication that the message thread has been pinned to the first position in the GUI that correspond with the allocable region. For example, the one or more graphical icons may include an emoji or combination of emoji.

According to certain example embodiments, receiving the input that selects or otherwise identifies the specific message thread from among the plurality of message threads via the GUI may include receiving an indication of the one or more users party to the selected message thread. For example, a first user may provide an input that selects a user identifier corresponding to a second user engaged in a message thread with the first user. In response, based on the selection of the user identifier that corresponds with the second user, the message prioritization interface may identify the message thread between the first user and the second user, and allocate the message thread to the allocable region within the GUI.

In some embodiments, responsive to receiving the input from a first user to allocate a message thread between the first user and a second user to an allocable region in the GUI, the message prioritization interface may cause display of a notification indicating that the message thread has been prioritized to the second user. The notification may for example include a display of a user identifier of the first user and the second user, or a shared identifier selected by the first user and the second user.

In some embodiments, the message prioritization interface may detect that the first user and the second user independently provided inputs allocating a shared message thread to allocable regions within corresponding GUI. Responsive to detecting that both the first user and the second user allocated the shared message thread to the allocable region of their corresponding GUI, the message prioritization interface may present the notification that includes the user identifiers of the first user and the second user.

According to certain example embodiments, a user may deallocate a message thread from an allocable region by either providing an explicit input that deallocates a message thread from the allocable region, or by providing an input that allocates another message thread to the same allocable region. In response to deallocating the message thread for the allocable region, the message prioritization interface may determine a timestamp of a most recent message of the message thread and move the message thread to a position among the presentation of the plurality of message threads based on the timestamp.

Consider an illustrative example from a user perspective. A user (User-A) may access a message feed comprising a plurality of message threads that the user is engaged in, wherein each message thread includes one or more users engaged in the message threads with User-A. The message prioritization interface may generate and cause display of a presentation of the plurality of message threads, wherein the presentation of the plurality of message threads is based on a chronological sort order, such that message threads which the user has most recently engaged in (i.e., sent or received a message) are presented higher (i.e., closer to the top of the message feed).

User-A may identify a message thread of particular importance and choose to pin the message thread to an allocable region at a predefined position relative to the presentation of the plurality of message threads. User-A provides an input that either explicitly selects the message thread and moves it to the allocable region in the GUI (i.e., drag and drop), or may provide an input selecting the allocable region, and then allocating the message thread to the allocable region through a drop-down menu. In some embodiments, User-A may select or identify a user identifier of a second user engaged in the message thread in order to allocate the message thread shared between User-A and the second user to the allocable region.

The message prioritization interface moves a display of the message thread to the allocable region and presents one or more graphical icons within the display of the message thread, such as a push-pin icon, or an emoji. The message thread allocated to the allocable region may thereby remain "pinned" to the allocable region irrespective of timestamps of subsequent messages received by User-A.

FIG. 1 is a block diagram showing an example messaging system 100 for exchanging data (e.g., messages and associated content) over a network. The messaging system 100 includes multiple client devices 102, each of which hosts a number of applications including a messaging client application 104. Each messaging client application 104 is communicatively coupled to other instances of the messaging client application 104 and a messaging server system 108 via a network 106 (e.g., the Internet).

Accordingly, each messaging client application 104 is able to communicate and exchange data with another messaging client application 104 and with the messaging server system 108 via the network 106. The data exchanged between messaging client applications 104, and between a messaging client application 104 and the messaging server system 108, includes functions (e.g., commands to invoke functions) as well as payload data (e.g., text, audio, video or other multimedia data).

The messaging server system 108 provides server-side functionality via the network 106 to a particular messaging client application 104. While certain functions of the messaging system 100 are described herein as being performed by either a messaging client application 104 or by the messaging server system 108, it will be appreciated that the location of certain functionality either within the messaging client application 104 or the messaging server system 108 is a design choice. For example, it may be technically preferable to initially deploy certain technology and functionality within the messaging server system 108, but to later migrate this technology and functionality to the messaging client application 104 where a client device 102 has a sufficient processing capacity.

The messaging server system 108 supports various services and operations that are provided to the messaging client application 104. Such operations include transmitting data to, receiving data from, and processing data generated by the messaging client application 104. In some embodiments, this data includes, message content, client device information, geolocation information, media annotation and overlays, message content persistence conditions, social network information, and live event information, as examples. In other embodiments, other data is used. Data exchanges within the messaging system 100 are invoked and controlled through functions available via GUIs of the messaging client application 104.

Turning now specifically to the messaging server system 108, an Application Program Interface (API) server 110 is coupled to, and provides a programmatic interface to, an application server 112. The application server 112 is communicatively coupled to a database server 118, which facilitates access to a database 120 in which is stored data associated with messages processed by the application server 112.

Dealing specifically with the Application Program Interface (API) server 110, this server receives and transmits message data (e.g., commands and message payloads) between the client device 102 and the application server 112. Specifically, the Application Program Interface (API) server 110 provides a set of interfaces (e.g., routines and protocols) that can be called or queried by the messaging client application 104 in order to invoke functionality of the application server 112. The Application Program Interface (API) server 110 exposes various functions supported by the application server 112, including account registration, login functionality, the sending of messages, via the application server 112, from a particular messaging client application 104 to another messaging client application 104, the sending of media files (e.g., images or video) from a messaging client application 104 to the messaging server application 114, and for possible access by another messaging client application 104, the setting of a collection of media data (e.g., story), the retrieval of a list of friends of a user of a client device 102, the retrieval of such collections, the retrieval of messages and content, the adding and deletion of friends to a social graph, the location of friends within a social graph, opening and application event (e.g., relating to the messaging client application 104).

The application server 112 hosts a number of applications and subsystems, including a messaging server application 114, an image processing system 116, a social network system 122, and a message prioritization system 124. The messaging server application 114 implements a number of message processing technologies and functions, particularly related to the aggregation and other processing of content (e.g., textual and multimedia content) included in messages received from multiple instances of the messaging client application 104. As will be described in further detail, the text and media content from multiple sources may be aggregated into collections of content (e.g., called stories, galleries, or collections). These collections are then made available, by the messaging server application 114, to the messaging client application 104. Other processor and memory intensive processing of data may also be performed server-side by the messaging server application 114, in view of the hardware requirements for such processing.

The application server 112 also includes an image processing system 116 that is dedicated to performing various image processing operations, typically with respect to images or video received within the payload of a message at the messaging server application 114.

The social network system 122 supports various social networking functions services and makes these functions and services available to the messaging server application 114. To this end, the social network system 122 maintains and accesses an entity graph 304 within the database 120. Examples of functions and services supported by the social network system 122 include the identification of other users of the messaging system 100 with which a particular user has relationships or is "following," and also the identification of other entities and interests of a particular user.

The application server 112 is communicatively coupled to a database server 118, which facilitates access to a database 120 in which is stored data associated with messages processed by the messaging server application 114.

Figure 2:
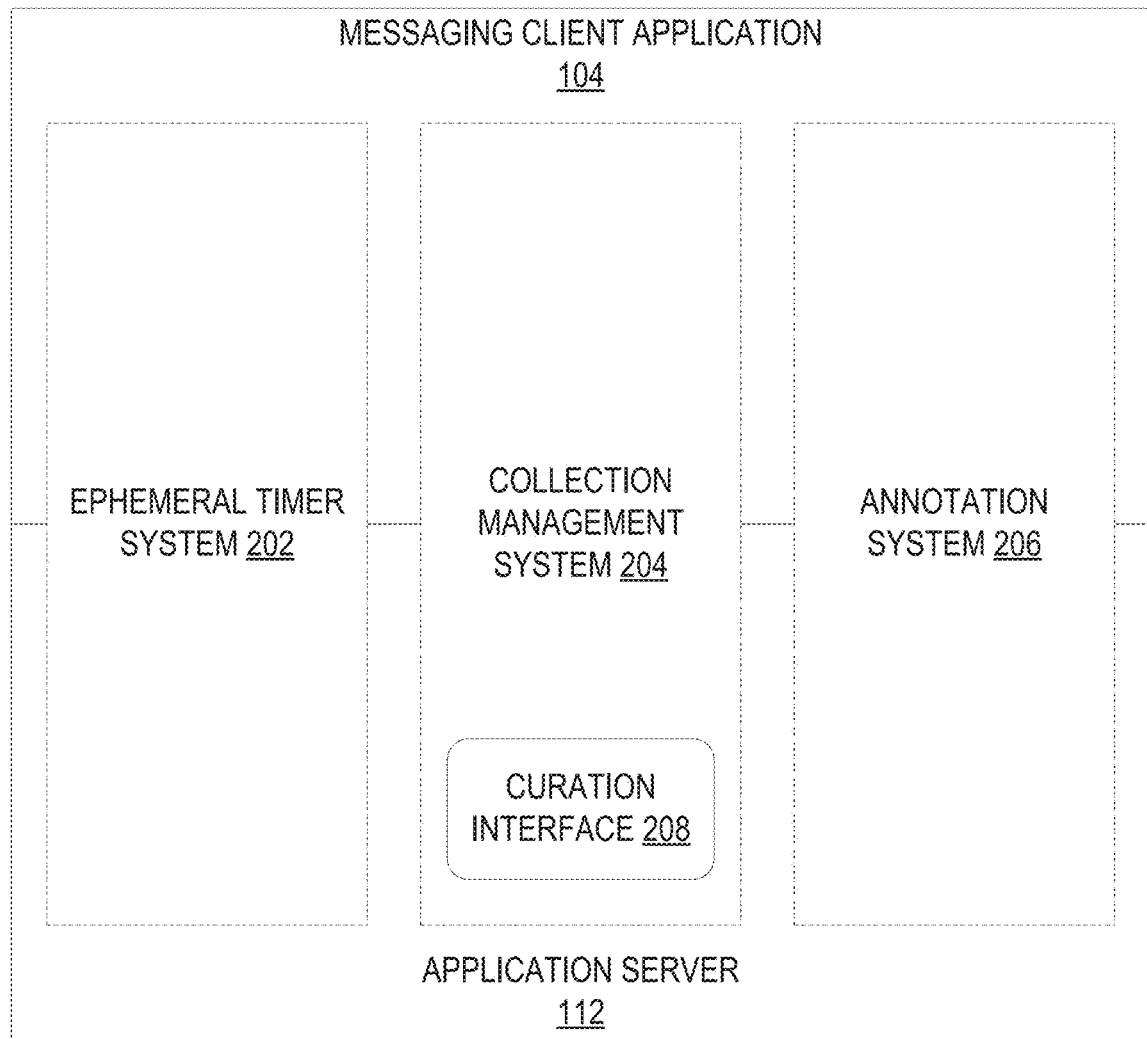
FIG. 2 is block diagram illustrating further details regarding a messaging system, according to example embodiments.

FIG. 2 is block diagram illustrating further details regarding the messaging system 100, according to example embodiments. Specifically, the messaging system 100 is shown to comprise the messaging client application 104 and the application server 112, which in turn embody a number of some subsystems, namely an ephemeral timer system 202, a collection management system 204 and an annotation system 206.

The ephemeral timer system 202 is responsible for enforcing the temporary access to content permitted by the messaging client application 104 and the messaging server application 114. To this end, the ephemeral timer system 202 incorporates a number of timers that, based on duration and display parameters associated with a message, collection of messages, or graphical element, selectively display and enable access to messages and associated content via the messaging client application 104. Further details regarding the operation of the ephemeral timer system 202 are provided below.

The collection management system 204 is responsible for managing collections of media (e.g., a media collection that includes collections of text, image video and audio data). In some examples, a collection of content (e.g., messages, including images, video, text and audio) may be organized into an "event gallery" or an "event story." Such a collection may be made available for a specified time period, such as the duration of an event to which the content relates. For example, content relating to a music concert may be made available as a "story" for the duration of that music concert. The collection management system 204 may also be responsible for publishing an icon that provides notification of the existence of a particular collection to the user interface of the messaging client application 104.

The collection management system 204 furthermore includes a curation interface 208 that allows a collection manager to manage and curate a particular collection of content. For example, the curation interface 208 enables an event organizer to curate a collection of content relating to a specific event (e.g., delete inappropriate content or redundant messages). Additionally, the collection management system 204 employs machine vision (or image recognition technology) and content rules to automatically curate a content collection. In certain embodiments, compensation may be paid to a user for inclusion of user generated content into a collection. In such cases, the curation interface 208 operates to automatically make payments to such users for the use of their content.

The annotation system 206 provides various functions that enable a user to annotate or otherwise modify or edit media content, such as user support content received by the user to be forwarded or redistributed to one or more recipients. For example, the annotation system 206 provides functions related to the generation and publishing of media overlays for messages processed by the messaging system 100. The annotation system 206 operatively supplies a media overlay to the messaging client application 104 based on a geolocation of the client device 102. In another example, the annotation system 206 operatively supplies a media overlay to the messaging client application 104 based on other information, such as, social network information of the user of the client device 102. A media overlay may include audio and visual content and visual effects, as well as augmented reality overlays. Examples of audio and visual content include pictures, texts, logos, animations, and sound effects, as well as animated facial models, image filters, and augmented reality media content. An example of a visual effect includes color overlaying. The audio and visual content or the visual effects can be applied to a media content item (e.g., a photo or video or live stream) at the client device 102. For example, the media overlay including text that can be overlaid on top of a photograph generated taken by the client device 102. In another example, the media overlay includes an identification of a location overlay (e.g., Venice beach), a name of a live event, or a name of a merchant overlay (e.g., Beach Coffee House). In another example, the annotation system 206 uses the geolocation of the client device 102 to identify a media overlay that includes the name of a merchant at the geolocation of the client device 102. The media overlay may include other indicia associated with the merchant. The media overlays may be stored in the database 120 and accessed through the database server 118.

In one example embodiment, the annotation system 206 provides a user-based publication platform that enables users to select a geolocation on a map, and upload content associated with the selected geolocation. The user may also specify circumstances under which a particular media overlay should be offered to other users. The annotation system 206 generates a media overlay that includes the uploaded content and associates the uploaded content with the selected geolocation.

Figure 3:
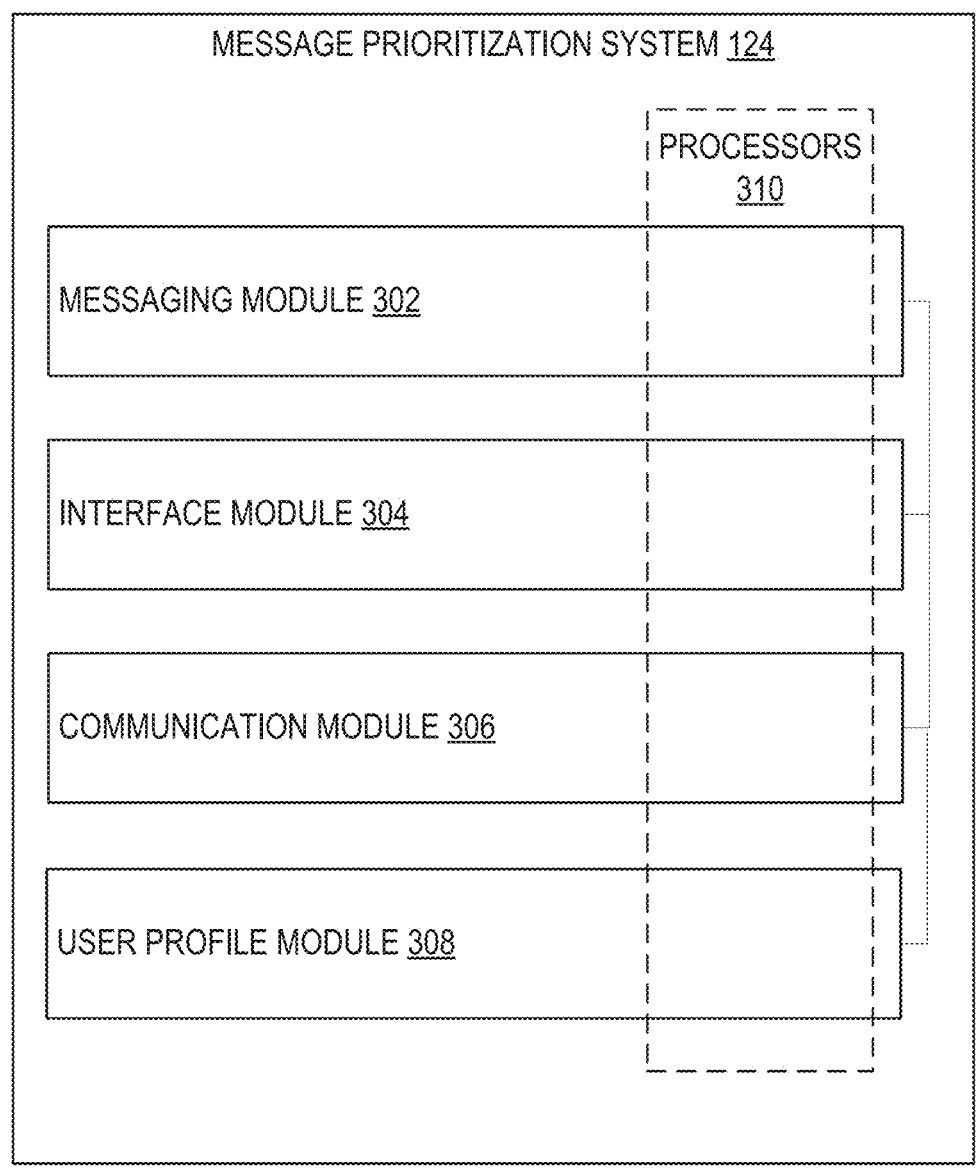
FIG. 3 is a block diagram illustrating various modules of a message prioritization system, according to certain example embodiments.

In another example embodiment, the annotation system 206 provides a merchant-based publication platform that enables merchants to select a particular media overlay associated with a geolocation. For example, the annotation system 206 associates the media overlay of a highest bidding merchant with a corresponding geolocation for a predefined amount of time FIG. 3 is a block diagram illustrating components of the message prioritization system 124 that configure the message prioritization system 124 to allocate a display of a message thread to an allocable region at a predefined position in a GUI. For example, according to certain embodiments, the message prioritization system 124 may perform operations that include: accessing a message repository associated with a user account, where the message repository comprises a plurality of message threads; generating a GUI that comprises an allocable region at a first position in the GUI, and a presentation of the plurality of message threads at a second position within the GUI; receiving an input that selects or otherwise identifies a specific message thread from among the plurality of message threads via the GUI; and allocating the selected message thread to the allocable region at the first position in the GUI in response to the input that selects or identifies the specific message thread.

The message prioritization system 124 is shown as including a messaging module 302, an interface module 304, a communication module 306, and a user profile module 308, all configured to communicate with each other (e.g., via a bus, shared memory, or a switch). Any one or more of these modules may be implemented using one or more processors 310 (e.g., by configuring such one or more processors to perform functions described for that module) and hence may include one or more of the processors 310.

Any one or more of the modules described may be implemented using hardware alone (e.g., one or more of the processors 310 of a machine) or a combination of hardware and software. For example, any module described of the message prioritization system 124 may physically include an arrangement of one or more of the processors 310 (e.g., a subset of or among the one or more processors of the machine) configured to perform the operations described herein for that module. As another example, any module of the message prioritization system 124 may include software, hardware, or both, that configure an arrangement of one or more processors 310 (e.g., among the one or more processors of the machine) to perform the operations described herein for that module. Accordingly, different modules of the message prioritization system 124 may include and configure different arrangements of such processors 310 or a single arrangement of such processors 310 at different points in time. Moreover, any two or more modules of the message prioritization system 124 may be combined into a single module, and the functions described herein for a single module may be subdivided among multiple modules. Furthermore, according to various example embodiments, modules described herein as being implemented within a single machine, database, or device may be distributed across multiple machines, databases, or devices.

FIG. 4 is a flowchart illustrating a method 400 for allocating a display of a message thread to an allocable region at a predefined position in a GUI, according to certain example embodiments. Operations of the method 400 may be performed by the modules described above with respect to FIG. 3. As shown in FIG. 4, the method 400 includes one or more operations 402, 404, 406, and 408.

At operation 402, the messaging module 302 accesses a message repository associated with a user account, wherein the message repository comprises a plurality of message threads that include at least a first message thread. According to certain example embodiments, the message repository may be hosted by the messaging server system 108, at the client device 102, or a combination thereof, wherein a portion of the message threads of the message repository associated with the user account are stored at the messaging server system 108, and another portion of the message threads associated with the user account are stored at the client device 102.

At operation 404, the interface module 304 generates a GUI that comprises an allocable region at a first position in the GUI and a presentation of the plurality of message threads at a second position in the GUI. In some embodiments, the allocable region may correspond with a top-most position in the presentation of the plurality of message threads. For example, the presentation of the plurality of message threads may comprise a ranked chronological listing of the message threads, wherein a most recent message may be presented at a top-most position among the presentation of the plurality of messages. According to certain embodiments, a user may allocate a message thread from among the plurality of message threads to the top-most position among the presentation of the plurality of messages.

Accordingly, at operation 406, the interface module 304 receives an input selecting a display of a message threads (i.e., a first message thread) from among the plurality of message threads. According to certain embodiments, a user may provide an explicit input that selects the message thread, and in response, the interface module 304 may present a menu element to enable a user to provide an input allocating the message thread to the allocable region at the predefined position in the GUI. In some embodiments, a user may provide an input dragging the selected message thread from a position in the GUI to the allocable region. In some embodiments, a user may provide an input identifying the message thread based on a message thread identifier associated with the message thread, or by providing an input that identifies of otherwise selects a user identifier of one or more users engaged in the message thread.

Responsive to the input that selects a message thread from among the plurality of message threads, at operation 408 the interface module 304 allocates the selected message thread (i.e., the first message thread) to the allocable region at the first position in the GUI. For example, as seen in the interface flow diagram 800 depicted in FIG. 8, the allocable region may include the allocable region 802.

FIG. 5 is a flowchart illustrating a method 500 for presenting a notification, according to certain example embodiments. Operations of the method 500 may be performed by the modules described above with respect to FIG. 3. As shown in FIG. 5, the method 500 includes one or more operations 502, and 504 which may be performed as a subroutine of the method 400 depicted in FIG. 4.

At operation 502, subsequent to allocating a message thread to an allocable region at a first position in a GUI, as described in operation 408 of the method 400, the messaging module 302 receives a message from a sender associated with the message thread allocated to the allocable region (i.e., the first message thread). For example, the message thread may include a "one to one" conversation between a first user and a second user, or a "one to many" conversation between a first user and many users. Responsive to receiving a new message in the message thread, from a sender engaged in the conversation associated with the message thread, the messaging module 302 may determine that the message thread has been allocated to the allocable region at the first position in the GUI.

At operation 504, responsive to receiving the message from the sender associated with the message thread allocated to the allocable region at the first position in the GUI, the interface module 304 generates and causes display of a notification based on the message within the allocable region. For example, the notification may include a timestamp, as well as notification content based on the sender of the message (e.g., a user identifier of the sender), as well as a presentation of message content.

FIG. 6 is a flowchart illustrating a method 600 for allocating a message thread to an allocable region at a predefined position in a GUI, according to certain example embodiments. Operations of the method 600 may be performed by the modules described above with respect to FIG. 3. As shown in FIG. 6, the method 600 includes one or more operations 602, and 604 which may be performed as a part of the method 400 depicted in FIG. 4. For example, the method 600 may be performed as a subroutine of operation 406 of the method 400.

According to certain example embodiments, and as discussed in operation 406 of the method 400, a user may provide an input that selects a message thread (i.e., a first message thread) from among a plurality of messages threads. In some embodiments, the input may include a "drag and drop" type input that selects a display of the message thread from among the presentation of a plurality of message threads, and "drags" the display of the message thread from an original position among the plurality of message threads to the allocable region in the GUI. In further embodiments, the input may include an input that selects an identifier associated with the message thread. For example, the identifier may be presented among a plurality of message thread identifiers. In further embodiments, and as described in operation 602 of the method 600, the input may include an input that selects or otherwise identifies one or more user identifiers of users engaged in the first message thread.

At operation 604, the interface module 304 allocates a display of the first message thread identified by the input to the allocable region at the first position in the GUI. In some embodiments, responsive to allocating the display of the first message thread to the allocable region at the first position in the GUI, the interface module 304 may cause the user profile module 308 to access a user profile associated with one or more users engaged in the first message thread to retrieve one or more graphical icons to be applied to the display of the first message thread.

In further embodiments, after allocating the first message thread to the allocable region at the first position in the GUI, a user may provide an input that selects or defines one or more graphical icons to be applied to the display of the first message thread. For example, as seen in the interface flow diagram 800 depicted in FIG. 8, the graphical icons may include the graphical icons 804.

FIG. 7 is a flowchart illustrating a method 700 for allocating a message thread to an allocable region at a predefined position in a GUI, according to certain example embodiments. Operations of the method 700 may be performed by the modules described above with respect to FIG. 3. As shown in FIG. 7, the method 700 includes one or more operations 702, 704, and 706, which may be performed subsequent to operation 408 of the method 400 depicted in FIG. 4.

As discussed in operation 408 of the method 400, a display of a message thread (i.e., a first message thread), may be allocated to an allocable region within a GUI responsive to an input (i.e., a first input) that identifies the first message thread. As discussed above, in some embodiments, only a single message thread may be allocated to the allocable region. Accordingly, at operation 702, the interface module 304 may receive a second input that identifies a display of a second message thread from among the plurality of message threads. In some embodiments, the second input may include an input that include a message identifier associated with the second message thread, or one or more user identifiers associated with users engaged in the second message thread.

At operation 704, responsive to receiving the input that identifies the second message thread, the interface module 304 de-allocates the first message thread from the allocable region within the GUI. In some embodiments, responsive to de-allocating the first message thread from the allocable region, the messaging module 302 and the communication module 306 may identify a timestamp associated with a most recent message of the first message thread. Based on the timestamp, the interface module 304 may move the display of the first message thread to a position among the presentation of the plurality of message thread based on the timestamp. For example, the presentation of the plurality of message thread may be presented in a chronological order based on timestamps associated with the plurality of message threads.

At operation 706, based on the input that selects the second message thread, the interface module 304 allocates the second message thread to the allocable region within the GUI.

Figure 8A:
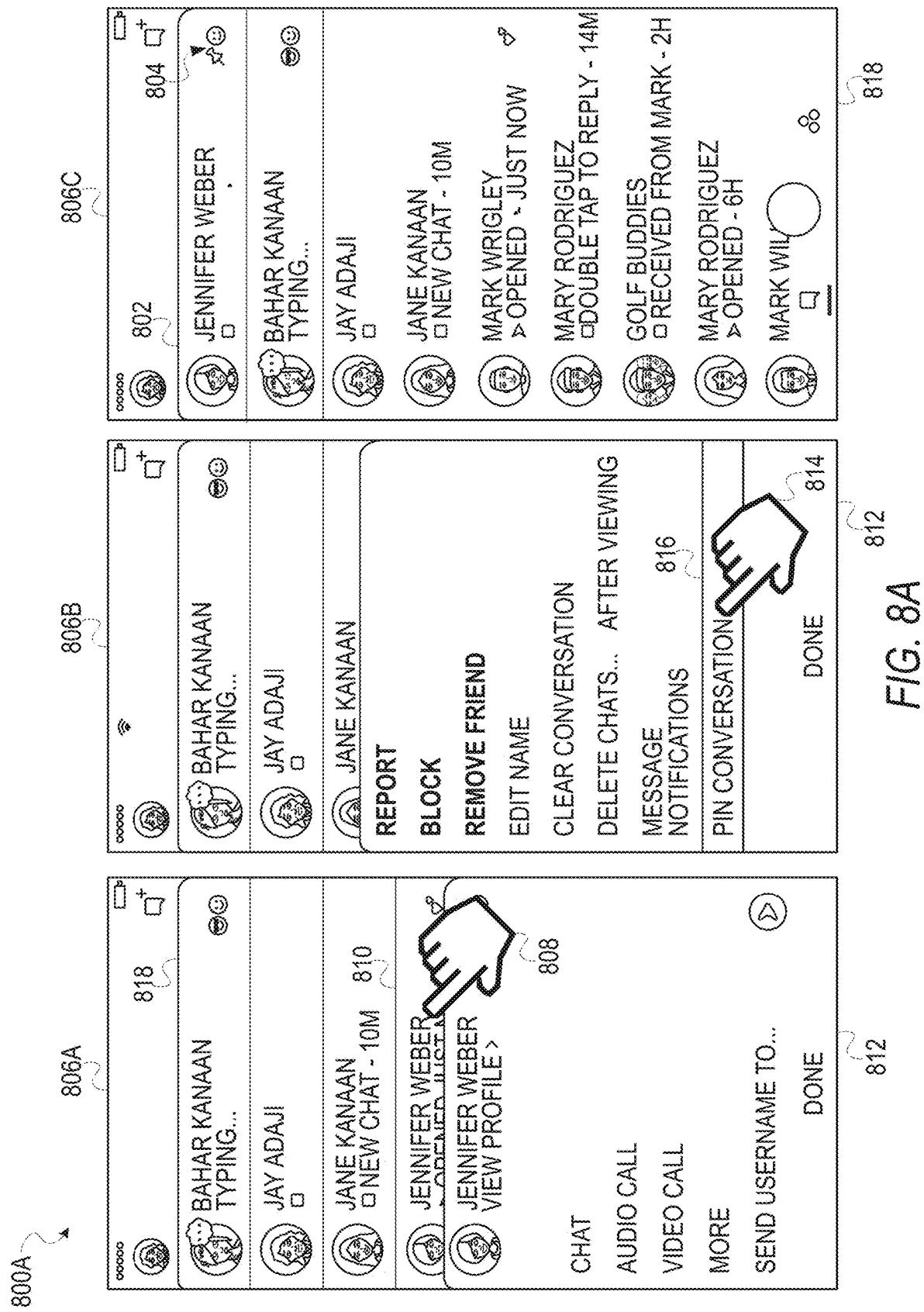
FIG. 8A/B rare interface flow diagram depicting interface states of a message prioritization interface, according to certain example embodiments.

FIG. 8A is an interface flow diagram 800A depicting various interface states 806A, 806B, and 806C of a message prioritization interface.

As seen in the flow diagram 800, the message prioritization interface may transition between one or more interface states 806A, 806B, and 806C based on inputs received from a user of a client device 102, including the inputs described in the methods 400, 500, 600, and 700. For example, interface state 806A may comprise a presentation of a plurality of message threads 818 at a position in the message prioritization interface. As discussed in operation 406 of the method 400 depicted in FIG. 4, a user may provide an input

808 that selects a display of a message thread 810 from among the plurality of message threads 818. Responsive to receiving the input 808 that selects the display of the message thread 810, the interface module 304 may cause display of the menu element 812 within the message prioritization interface.

In some embodiments, the menu element 812 may comprise a display of one or more messaging options. For example, the user profile module 308 may access a user profile associated with one or more users associated with the display of the message thread 810 and cause the interface module 304 to present at least a portion of the user profile data within the menu element 812A.

As seen in interface state 806B, the menu element 812B may include one or more messaging options associated with the selected message thread 810, including the prioritization option 816. Responsive to receiving the input 814 that selects the prioritization option 816, the interface module 304 may cause display of the display of the message thread 810 within the allocable region 802 of the message prioritization interface, as seen in interface state 806C. In some embodiments, the allocable region 802 may be at a position in the message prioritization interface relative to the presentation of the plurality of message threads 818.

Figure 8B:
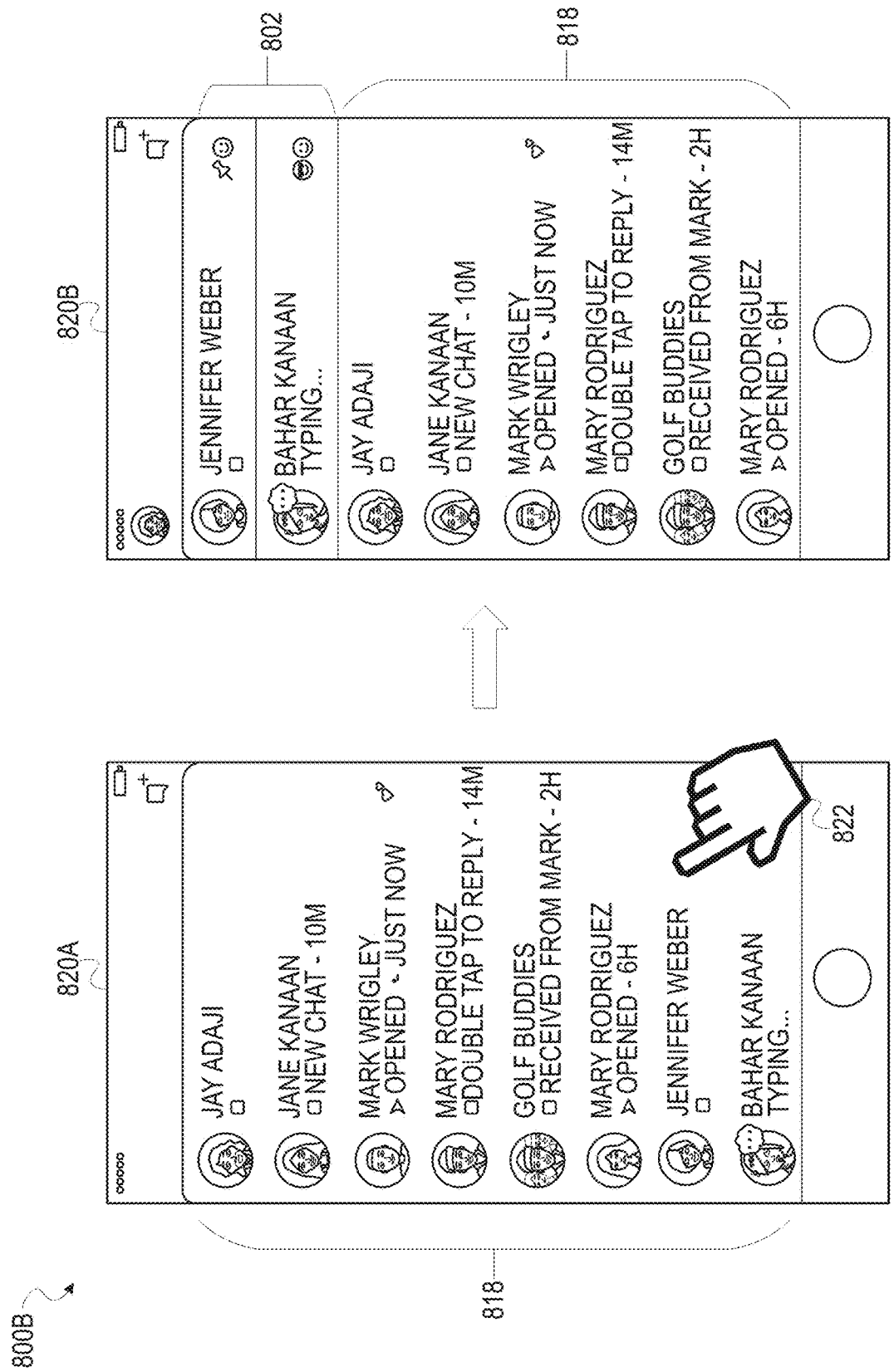

FIG. 8B is an interface flow diagram 800B depicting interface states 820A and 820B of a message prioritization interface.

According to certain example embodiments, absent an explicit input to allocate displays of one or more message threads to an allocable region within the GUI, the message prioritization system 124 may present the plurality of message threads 818 in the message prioritization interface without any allocable region at all. For example, as seen in interface state 820A, the plurality of message threads 818 are displayed in the entirety of the interface, such that a sort order of the plurality of message threads 818 may be based on message attributes of the plurality of message threads 818 (e.g., timestamps).

Accordingly, as discussed in the method 400 depicted in FIG. 4, responsive to receiving one or more inputs 822 that select one or more message threads, the interface module 304 may allocate a corresponding number of allocable regions 802 within the message prioritization interface, as seen in interface state 820B. In some embodiments, there may be a maximum number of allocable regions that can be allocated in the message prioritization interface (i.e., three allocable region). For example, according to certain embodiments, a user of the message prioritization interface may allocate up to 3 message threads to allocable regions of the GUI. In further embodiments, the message prioritization system 124 may allocate as many allocable regions as user inputs.

Figure 9:
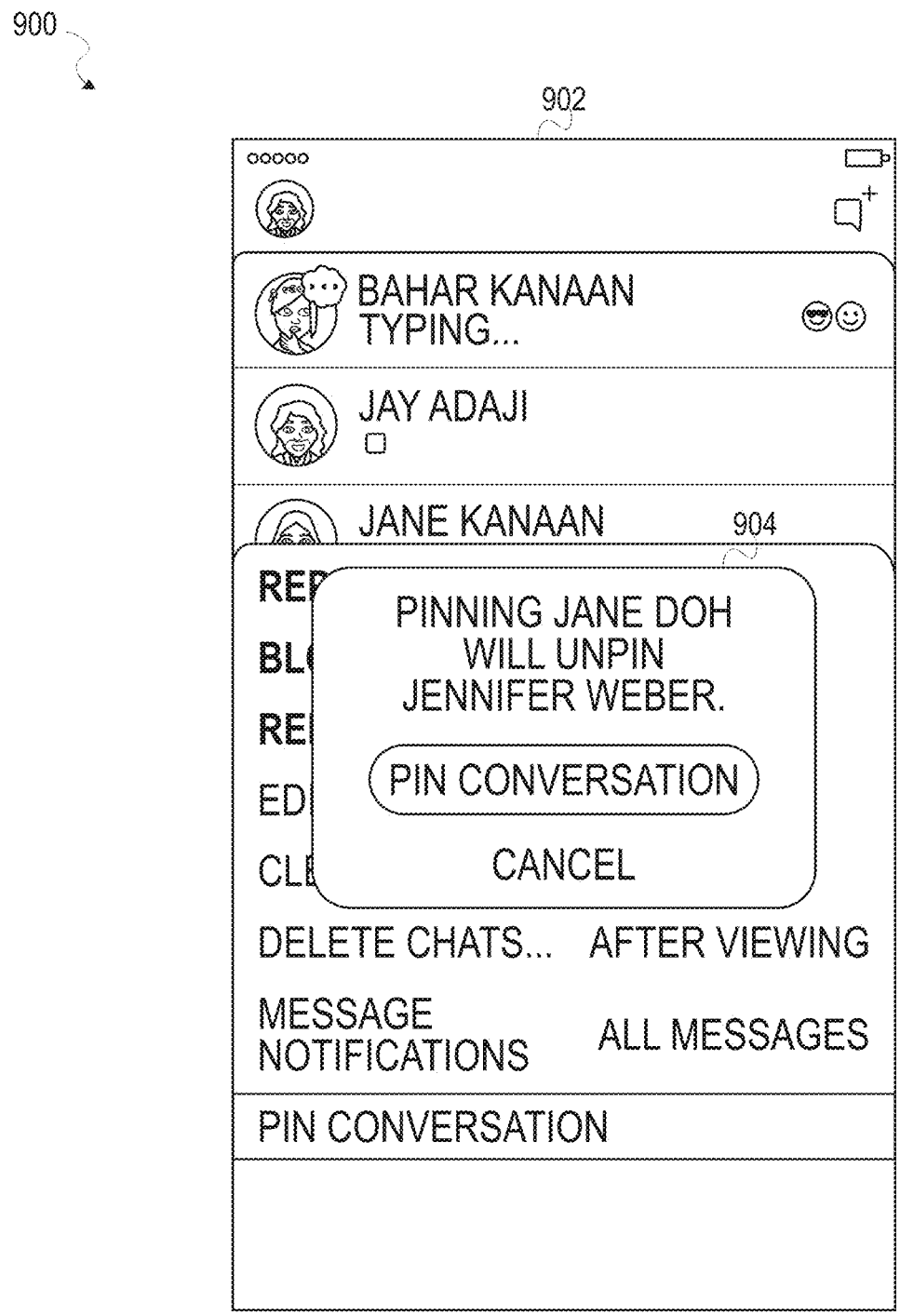
FIG. 9 is an interface diagram depicting a message prioritization interface, according to certain example embodiments.

FIG. 9 is an interface diagram 900 depicting a message prioritization interface 902, according to certain example embodiments, and as discussed in the method 700 depicted in FIG. 7.

As discussed in operations 702, 704, and 706 of the method 700, responsive to receiving an input allocating a message thread to an allocable region, the interface module 304 may de-allocate a first message thread (already allocated to the allocable region) in order to allocate a second message thread to the allocable region. As seen in FIG. 9, responsive to receiving the input that selects the second message thread, the interface module 304 may present the notification 904, wherein the notification 904 includes a display of one or more message attributes of the first message thread and the second message thread.

For example, the notification may include a request to confirm that a user would like to de-allocate a first message thread and allocate a second message thread to the allocable region of the GUI.

Software Architecture

Figure 10:
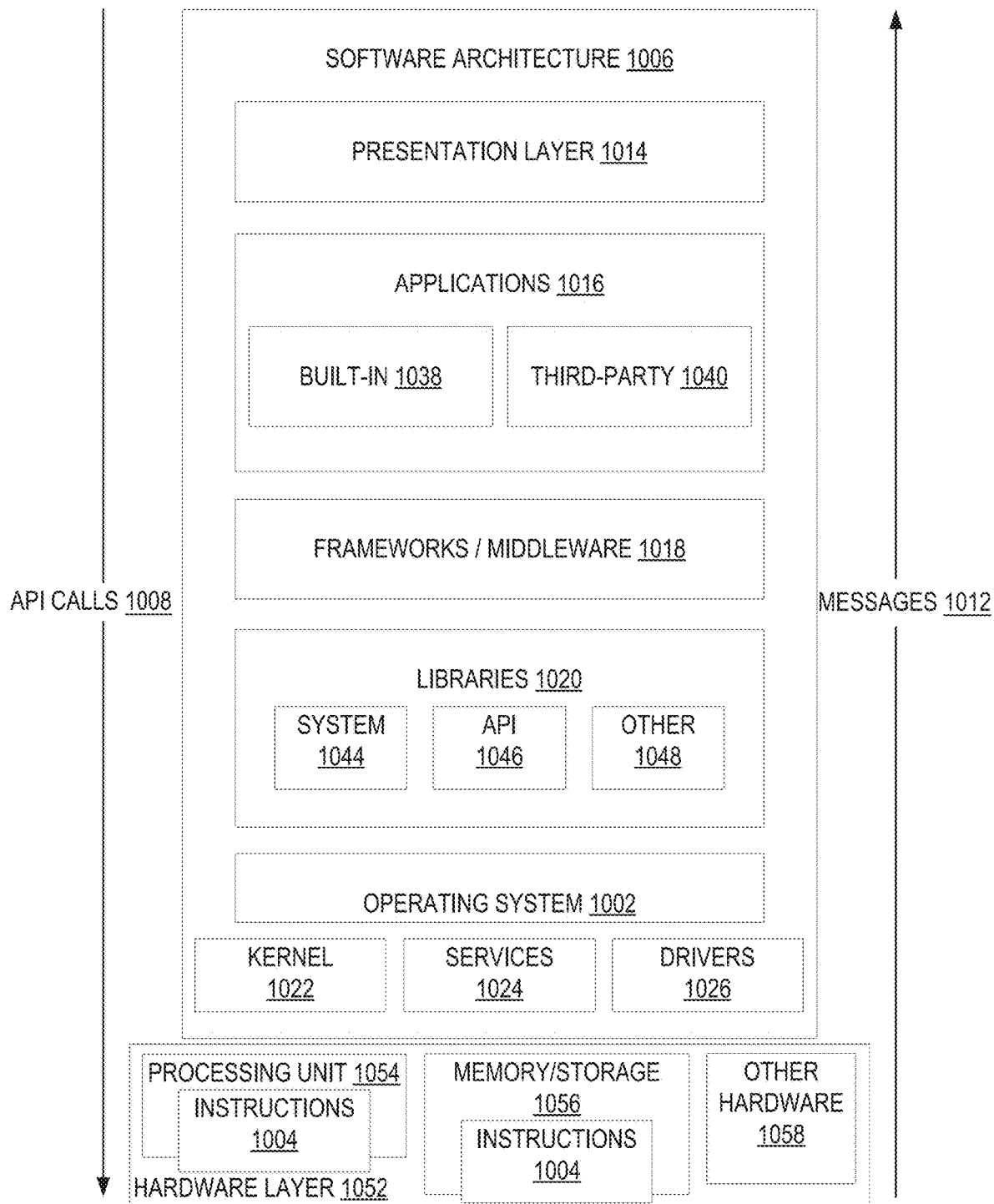
FIG. 10 is a block diagram illustrating a representative software architecture, which may be used in conjunction with various hardware architectures herein described and used to implement various embodiments.

FIG. 10 is a block diagram illustrating an example software architecture 1006, which may be used in conjunction with various hardware architectures herein described. FIG. 10 is a non-limiting example of a software architecture and it will be appreciated that many other architectures may be implemented to facilitate the functionality described herein. The software architecture 1006 may execute on hardware such as the machine 1100 of FIG. 11 that includes, among other things, processors 1104, memory 1114, and I/O components 1118. A representative hardware layer 1052 is illustrated and can represent, for example, the machine 1000 of FIG. 10. The representative hardware layer 1052 includes a processing unit 1054 having associated executable instructions 1004. Executable instructions 1004 represent the executable instructions of the software architecture 1006, including implementation of the methods, components and so forth described herein. The hardware layer 1052 also includes memory and/or storage modules memory/storage 1056, which also have executable instructions 1004. The hardware layer 1052 may also comprise other hardware 1058.

In the example architecture of FIG. 10, the software architecture 1006 may be conceptualized as a stack of layers where each layer provides particular functionality. For example, the software architecture 1006 may include layers such as an operating system 1002, libraries 1020, applications 1016 and a presentation layer 1014. Operationally, the applications 1016 and/or other components within the layers may invoke application programming interface (API) API calls 1008 through the software stack and receive a response as in response to the API calls 1008. The layers illustrated are representative in nature and not all software architectures have all layers. For example, some mobile or special purpose operating systems may not provide a frameworks/middleware 1018, while others may provide such a layer. Other software architectures may include additional or different layers.

The operating system 1002 may manage hardware resources and provide common services. The operating system 1002 may include, for example, a kernel 1022, services 1024 and drivers 1026. The kernel 1022 may act as an abstraction layer between the hardware and the other software layers. For example, the kernel 1022 may be responsible for memory management, processor management (e.g., scheduling), component management, networking, security settings, and so on. The services 1024 may provide other common services for the other software layers. The drivers 1026 are responsible for controlling or interfacing with the underlying hardware. For instance, the drivers 1026 include display drivers, camera drivers, Bluetooth® drivers, flash memory drivers, serial communication drivers (e.g., Universal Serial Bus (USB) drivers), Wi-Fi® drivers, audio drivers, power management drivers, and so forth depending on the hardware configuration.

The libraries 1020 provide a common infrastructure that is used by the applications 1016 and/or other components and/or layers. The libraries 1020 provide functionality that allows other software components to perform tasks in an easier fashion than to interface directly with the underlying operating system 1002 functionality (e.g., kernel 1022, services 1024 and/or drivers 1026). The libraries 1020 may include system libraries 1044 (e.g., C standard library) that may provide functions such as memory allocation functions, string manipulation functions, mathematical functions, and the like. In addition, the libraries 1020 may include API libraries 1046 such as media libraries (e.g., libraries to support presentation and manipulation of various media format such as MPREG4, H.264, MP3, AAC, AMR, JPG, PNG), graphics libraries (e.g., an OpenGL framework that may be used to render 2D and 3D in a graphic content on a display), database libraries (e.g., SQLite that may provide various relational database functions), web libraries (e.g., WebKit that may provide web browsing functionality), and the like. The libraries 1020 may also include a wide variety of other libraries 1048 to provide many other APIs to the applications 1016 and other software components/modules.

The frameworks/middleware 1018 (also sometimes referred to as middleware) provide a higher-level common infrastructure that may be used by the applications 1016 and/or other software components/modules. For example, the frameworks/middleware 1018 may provide various graphic user interface (GUI) functions, high-level resource management, high-level location services, and so forth. The frameworks/middleware 1018 may provide a broad spectrum of other APIs that may be utilized by the applications 1016 and/or other software components/modules, some of which may be specific to a particular operating system 1002 or platform.

The applications 1016 include built-in applications 1038 and/or third-party applications 1040. Examples of representative built-in applications 1038 may include, but are not limited to, a contacts application, a browser application, a book reader application, a location application, a media application, a messaging application, and/or a game application. Third-party applications 1040 may include an application developed using the ANDROID™ or IOS™ software development kit (SDK) by an entity other than the vendor of the particular platform, and may be mobile software running on a mobile operating system such as IOS™, ANDROID™, WINDOWS® Phone, or other mobile operating systems. The third-party applications 1040 may invoke the API calls 1008 provided by the mobile operating system (such as operating system 1002) to facilitate functionality described herein.

The applications 1016 may use built in operating system functions (e.g., kernel 1022, services 1024 and/or drivers 1026), libraries 1020, and frameworks/middleware 1018 to create user interfaces to interact with users of the system. Alternatively, or additionally, in some systems interactions with a user may occur through a presentation layer, such as presentation layer 1014. In these systems, the application/component "logic" can be separated from the aspects of the application/component that interact with a user.

Figure 11:
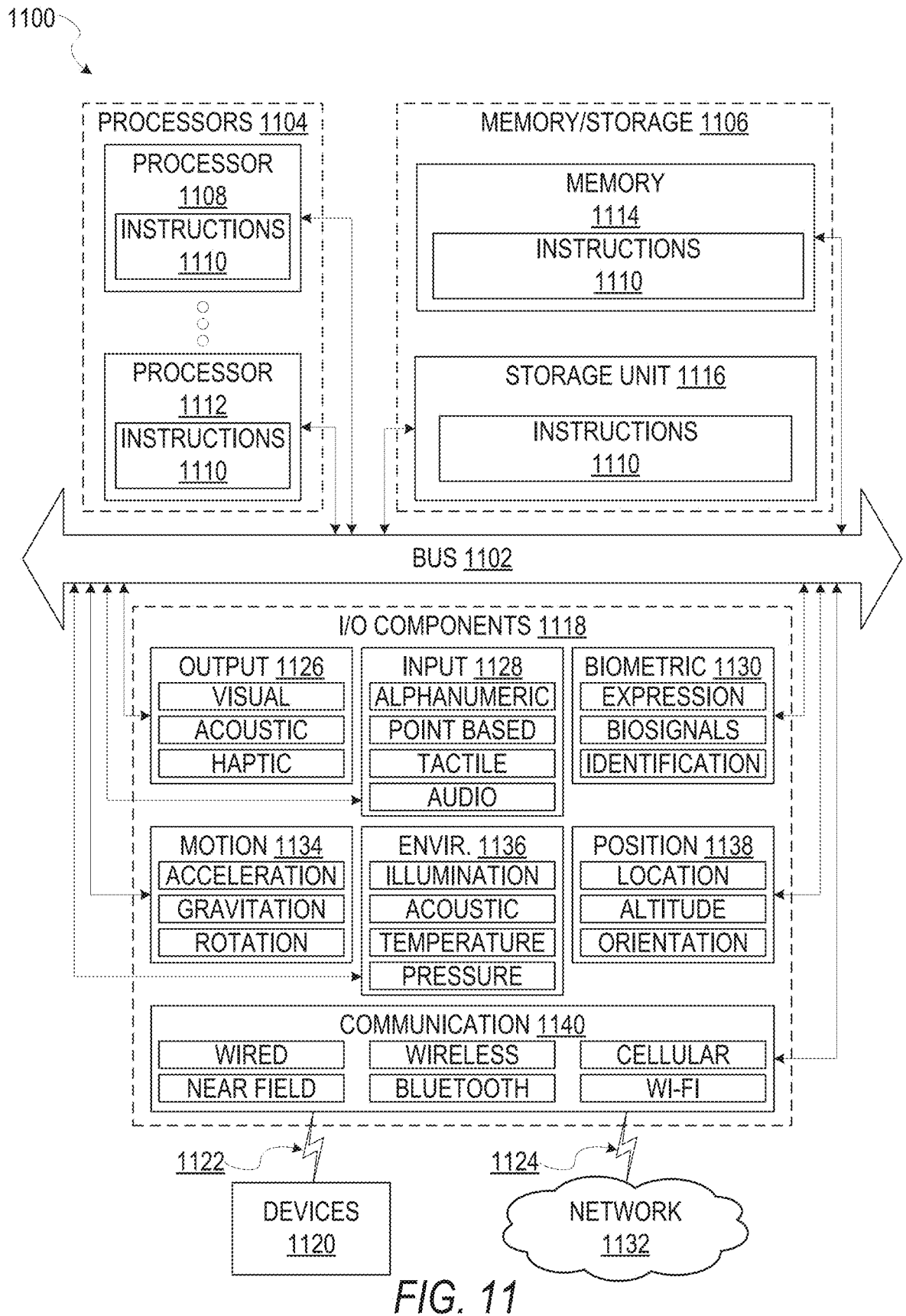
FIG. 11 is a block diagram illustrating components of a machine, according to some example embodiments, able to read instructions from a machine-readable medium (e.g., a machine-readable storage medium) and perform any one or more of the methodologies discussed herein.

FIG. 11 is a block diagram illustrating components of a machine 1100, according to some example embodiments, able to read instructions from a machine-readable medium (e.g., a machine-readable storage medium) and perform any one or more of the methodologies discussed herein. Specifically, FIG. 11 shows a diagrammatic representation of the machine 1100 in the example form of a computer system, within which instructions 1110 (e.g., software, a program, an application, an applet, an app, or other executable code) for causing the machine 1100 to perform any one or more of the methodologies discussed herein may be executed. As such, the instructions 1110 may be used to implement modules or components described herein. The instructions 1110 transform the general, non-programmed machine 1100 into a particular machine 1100 programmed to carry out the described and illustrated functions in the manner described.

In alternative embodiments, the machine 1100 operates as a standalone device or may be coupled (e.g., networked) to other machines. In a networked deployment, the machine 1100 may operate in the capacity of a server machine or a client machine in a server-client network environment, or as a peer machine in a peer-to-peer (or distributed) network environment. The machine 1100 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 1110, sequentially or otherwise, that specify actions to be taken by machine 1100. Further, while only a single machine 1100 is illustrated, the term "machine" shall also be taken to include a collection of machines that individually or jointly execute the instructions 1110 to perform any one or more of the methodologies discussed herein.

The machine 1100 may include processors 1104, memory memory/storage 1106, and I/O components 1118, which may be configured to communicate with each other such as via a bus 1102. The memory/storage 1106 may include a memory 1114, such as a main memory, or other memory storage, and a storage unit 1116, both accessible to the processors 1104 such as via the bus 1102. The storage unit 1116 and memory 1114 store the instructions 1110 embodying any one or more of the methodologies or functions described herein. The instructions 1110 may also reside, completely or partially, within the memory 1114, within the storage unit 1116, within at least one of the processors 1104 (e.g., within the processor's cache memory), or any suitable combination thereof, during execution thereof by the machine 1100. Accordingly, the memory 1114, the storage unit 1116, and the memory of processors 1104 are examples of machine-readable media.

The I/O components 1118 may include a wide variety of components to receive input, provide output, produce output, transmit information, exchange information, capture measurements, and so on. The specific I/O components 1118 that are included in a particular machine 1100 will depend on the type of machine. For example, portable machines such as mobile phones will likely include a touch input device or other such input mechanisms, while a headless server machine will likely not include such a touch input device. It will be appreciated that the I/O components 1118 may include many other components that are not shown in FIG. 11. The I/O components 1118 are grouped according to functionality merely for simplifying the following discussion and the grouping is in no way limiting. In various example embodiments, the I/O components 1118 may include output components 1126 and input components 1128. The output components 1126 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 1128 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or other pointing instrument), tactile input components (e.g., a physical button, a touch screen that provides location and/or force of touches or touch gestures, or other tactile input components), audio input components (e.g., a microphone), and the like.

In further example embodiments, the I/O components 1118 may include biometric components 1130, motion components 1134, environmental environment components 1136, or position components 1138 among a wide array of other components. For example, the biometric components 1130 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 1134 may include acceleration sensor components (e.g., accelerometer), gravitation sensor components, rotation sensor components (e.g., gyroscope), and so forth. The environment components 1136 may include, for example, illumination sensor components (e.g., photometer), temperature sensor components (e.g., one or more thermometer that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 1138 may include location sensor components (e.g., a Global Position system (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1118 may include communication components 1140 operable to couple the machine 1100 to a network 1132 or devices 1120 via coupling 1122 and coupling 1124 respectively. For example, the communication components 1140 may include a network interface component or other suitable device to interface with the network 1132. In further examples, communication components 1140 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 1120 may be another machine or any of a wide variety of peripheral devices (e.g., a peripheral device coupled via a Universal Serial Bus (USB)).

Moreover, the communication components 1140 may detect identifiers or include components operable to detect identifiers. For example, the communication components 1140 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 1140, such as, location via Internet Protocol (IP) geo-location, location via Wi-Fi® signal triangulation, location via detecting a NFC beacon signal that may indicate a particular location, and so forth.

Glossary

"CARRIER SIGNAL" in this context refers to any intangible medium that is capable of storing, encoding, or carrying instructions for execution by the machine, and includes digital or analog communications signals or other intangible medium to facilitate communication of such instructions. Instructions may be transmitted or received over the network using a transmission medium via a network interface device and using any one of a number of well-known transfer protocols.

"CLIENT DEVICE" in this context refers to any machine that interfaces to a communications network to obtain resources from one or more server systems or other client devices. A client device may be, but is not limited to, a mobile phone, desktop computer, laptop, portable digital assistants (PDAs), smart phones, tablets, ultra books, netbooks, laptops, multi-processor systems, microprocessor-based or programmable consumer electronics, game consoles, set-top boxes, or any other communication device that a user may use to access a network.

"COMMUNICATIONS NETWORK" in this context refers to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network and the coupling may be a Code Division Multiple Access (CDMA) connection, a Global System for Mobile communications (GSM) connection, or other type of cellular or wireless coupling. In this example, the coupling may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard setting organizations, other long range protocols, or other data transfer technology.

"EMPHEMERAL MESSAGE" in this context refers to a message that is accessible for a time-limited duration. An ephemeral message may be a text, an image, a video and the like. The access time for the ephemeral message may be set by the message sender. Alternatively, the access time may be a default setting or a setting specified by the recipient. Regardless of the setting technique, the message is transitory.

"MACHINE-READABLE MEDIUM" in this context refers to a component, device or other tangible media able to store instructions and data temporarily or permanently and may include, but is not limited to, random-access memory (RAM), read-only memory (ROM), buffer memory, flash memory, optical media, magnetic media, cache memory, other types of storage (e.g., Erasable Programmable Read-Only Memory (EEPROM)) and/or any suitable combination thereof. The term "machine-readable medium" should be taken to include a single medium or multiple media (e.g., a centralized or distributed database, or associated caches and servers) able to store instructions. The term "machine-readable medium" shall also be taken to include any medium, or combination of multiple media, that is capable of storing instructions (e.g., code) for execution by a machine, such that the instructions, when executed by one or more processors of the machine, cause the machine to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

"COMPONENT" in this context refers to a device, physical entity or logic having boundaries defined by function or subroutine calls, branch points, application program interfaces (APIs), or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various example embodiments, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a Field-Programmable Gate Array (FPGA) or an Application Specific Integrated Circuit (ASIC). A hardware component may also include programmable logic or circuitry that is temporarily configured by software to perform certain operations. For example, a hardware component may include software executed by a general-purpose processor or other programmable processor. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software) may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In embodiments in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information). The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)). The performance of certain of the operations may be distributed among the processors, not only residing within a single machine, but deployed across a number of machines. In some example embodiments, the processors or processor-implemented components may be located in a single geographic location (e.g., within a home environment, an office environment, or a server farm). In other example embodiments, the processors or processor-implemented components may be distributed across a number of geographic locations.

"PROCESSOR" in this context refers to any circuit or virtual circuit (a physical circuit emulated by logic executing on an actual processor) that manipulates data values according to control signals (e.g., "commands", "op codes", "machine code", etc.) and which produces corresponding output signals that are applied to operate a machine. A processor may, for example, be a Central Processing Unit (CPU), a Reduced Instruction Set Computing (RISC) processor, a Complex Instruction Set Computing (CISC) processor, a Graphics Processing Unit (GPU), a Digital Signal Processor (DSP), an Application Specific Integrated Circuit (ASIC), a Radio-Frequency Integrated Circuit (RFIC) or any combination thereof. A processor may further be a multi-core processor having two or more independent processors (sometimes referred to as "cores") that may execute instructions contemporaneously.

"TIMESTAMP" in this context refers to a sequence of characters or encoded information identifying when a certain event occurred, for example giving date and time of day, sometimes accurate to a small fraction of a second.

What is claimed is:

1. A method comprising:
causing display of a graphical user interface (GUI) that comprises an allocable region at a predefined position among a plurality of message threads at a client device, the plurality of message threads including a display of a message thread that corresponds with a user account;
receiving an input that identifies the message thread;
presenting a menu element responsive to the input that selects the display of the message thread, the menu element comprising an identifier associated with the user account, and a set of menu options that include an option to allocate the message thread to the allocable region among the plurality of message threads within the GUI;
receiving an input that selects the option to allocate the message thread to the allocable region among the plurality of message threads within the GUI;
causing display of a notification that includes the identifier associated with the user account and a user identifier associated with the client device at the client device responsive to the input that selects the option to allocate the message thread to the allocable region; and
presenting the display of the message thread within the allocable region among the plurality of message threads based on the input, the display of the message thread including at least the identifier associated with the user account, and a graphical indicator associated with the allocable region, the graphical indicator comprising a graphical icon selected from among a plurality of graphical icons by a user of the user account.

2. The method of claim 1, wherein the identifier associated with the user account includes a graphical avatar.

3. The method of claim 1, further comprising:
receiving a message associated with the message thread; and
presenting a notification that includes a display of the message within the allocable region responsive to the receiving the message associated with the message thread.

4. The method of claim 1, further comprising:
identifying a client device associated with the sender of the message thread; and
presenting a notification at the client device based on the input that selects the option to allocate the message thread to the allocable region among the plurality of message threads within the GUI.

5. The method of claim 4, wherein the notification further comprises one or more user identifiers.

6. The method of claim 1, wherein the input that identifies the message thread further comprises a selection of an identifier associated with the message thread.

7. The method of claim 1, wherein the input that identifies the message thread further comprises a selection of the display of the message thread.

8. A system comprising:
a memory; and
at least one hardware processor coupled to the memory and comprising instructions that causes the system to perform operations comprising:
causing display of a graphical user interface (GUI) that comprises an allocable region at a predefined position among a plurality of message threads at a client device, the plurality of message threads including a display of a message thread that corresponds with a user account;
receiving an input that identifies the message thread;
presenting a menu element responsive to the input that selects the display of the message thread, the menu element comprising an identifier associated with the user account, and a set of menu options that include an option to allocate the message thread to the allocable region among the plurality of message threads within the GUI;
receiving an input that selects the option to allocate the message thread to the allocable region among the plurality of message threads within the GUI;
causing display of a notification that includes the identifier associated with the user account and a user identifier associated with the client device at the client device responsive to the input that selects the option to allocate the message thread to the allocable region; and
presenting the display of the message thread within the allocable region among the plurality of message threads based on the input, the display of the message thread including at least the identifier associated with the user account, and a graphical indicator associated with the allocable region, the graphical indicator comprising a graphical icon selected from among a plurality of graphical icons by a user of the user account.

9. The system of claim 8, wherein the identifier associated with the user account includes a graphical avatar.

10. The system of claim 8, further comprising:
receiving a message associated with the message thread; and
presenting a notification that includes a display of the message within the allocable region responsive to the receiving the message associated with the message thread.

11. The system of claim 8, further comprising:
identifying a client device associated with the sender of the message thread; and
presenting a notification at the client device based on the input that selects the option to allocate the message thread to the allocable region among the plurality of message threads within the GUI.

12. The system of claim 11, wherein the notification further comprises one or more user identifiers.

13. The system of claim 8, wherein the input that identifies the message thread further comprises a selection of an identifier associated with the message thread.

14. The system of claim 8, wherein the input that identifies the message thread further comprises a selection of the display of the message thread.

15. A non-transitory machine-readable storage medium comprising instructions that, when executed by one or more processors of a machine, cause the machine to perform operations comprising:

causing display of a graphical user interface (GUI) that comprises an allocable region at a predefined position among a plurality of message threads at a client device, the plurality of message threads including a display of a message thread that corresponds with a user account;

receiving an input that identifies the message thread;

presenting a menu element responsive to the input that selects the display of the message thread, the menu element comprising an identifier associated with the user account, and a set of menu options that include an option to allocate the message thread to the allocable region among the plurality of message threads within the GUI;

receiving an input that selects the option to allocate the message thread to the allocable region among the plurality of message threads within the GUI;

causing display of a notification that includes the identifier associated with the user account and a user identifier associated with the client device at the client device responsive to the input that selects the option to allocate the message thread to the allocable region; and presenting the display of the message thread within the allocable region among the plurality of message threads based on the input, the display of the message thread including at least the identifier associated with the user account, and a graphical indicator associated with the allocable region, the graphical indicator comprising a graphical icon selected from among a plurality of graphical icons by a user of the user account.

16. The non-transitory machine-readable storage medium of claim 15, wherein the identifier associated with the user account includes a graphical avatar.

17. The non-transitory machine-readable storage medium of claim 15, further comprising:

receiving a message associated with the message thread; and presenting a notification that includes a display of the message within the allocable region responsive to the receiving the message associated with the message thread.

\* \* \* \* \*